(12) United States Patent
Lenhart

(10) Patent No.: US 7,229,101 B2
(45) Date of Patent: Jun. 12, 2007

(54) TREKKING STICK WITH SHOCK ABSORBER

(76) Inventor: Klaus Lenhart, Mittlerer Weg 23, 73275 Ohmden (DE)

( * ) Notice: Subject to any disclaimer, the term of this patent is extended or adjusted under 35 U.S.C. 154(b) by 114 days.

(21) Appl. No.: 10/492,617

(22) PCT Filed: Oct. 5, 2002

(86) PCT No.: PCT/EP02/11198

§ 371 (c)(1),
(2), (4) Date: Sep. 24, 2004

(87) PCT Pub. No.: WO03/034859

PCT Pub. Date: May 1, 2003

(65) Prior Publication Data

US 2005/0023816 A1 Feb. 3, 2005

(30) Foreign Application Priority Data

Oct. 18, 2001 (DE) .......................... 201 17 146 U

(51) Int. Cl.
*A63C 11/22* (2006.01)
(52) U.S. Cl. .................. 280/819; 280/823; 135/82
(58) Field of Classification Search ............... 280/826, 280/819, 821, 823; 135/74, 82, 83
See application file for complete search history.

(56) References Cited

U.S. PATENT DOCUMENTS

| | | | | |
|---|---|---|---|---|
| 1,400,781 | A * | 12/1921 | Wagner, Jr. ............. | 16/42 R |
| 2,888,022 | A * | 5/1959 | Fanning ................ | 135/82 |
| 3,486,515 | A * | 12/1969 | Chrysostomides ........... | 135/69 |
| 4,061,347 | A * | 12/1977 | Stern et al. ................ | 280/821 |
| 4,134,703 | A * | 1/1979 | Hinners .................... | 403/104 |
| 4,244,602 | A * | 1/1981 | Allsop et al. .............. | 280/821 |
| 5,114,186 | A * | 5/1992 | Sugiyama .................. | 280/821 |
| 5,720,474 | A * | 2/1998 | Sugiyama .................. | 267/249 |
| 6,250,839 | B1 * | 6/2001 | Lenhart ................. | 403/109.5 |
| 6,254,134 | B1 * | 7/2001 | Panizza ................... | 280/819 |
| 2001/0011817 | A1 * | 8/2001 | Zaltron ................... | 280/821 |
| 2002/0170587 | A1 * | 11/2002 | Uemura ................... | 135/65 |

FOREIGN PATENT DOCUMENTS

| | | | |
|---|---|---|---|
| CH | 680771 | A5 | 11/1992 |
| DE | 29813601 | U1 | 1/2000 |
| EP | 0738837 | A2 | 10/1996 |
| EP | 0904810 | A2 | 3/1999 |

* cited by examiner

*Primary Examiner*—Christopher P. Ellis
*Assistant Examiner*—John Walters
(74) *Attorney, Agent, or Firm*—Sughrue Mion, PLLC

(57) ABSTRACT

A stick, such as a trekking stick, ski pole or walking stick, is provided with a shock absorber between a first and a second tubular section of a stick shaft that is equipped with a handle and a stick tip. According to the invention, the shock absorber comprises a guide sleeve, which is held in a rotationally fixed manner in a tubular section and In which a damping rod that is held in an axially fixed manner on the other tubular section Is guided and a compression spring device, operating between the guide sleeve and the damping rod. The aim of the invention is to obtain softer shock absorbing characteristics and resilience characteristics that are less abrupt with minimal kickback. This is achieved by the provision of an elastomer spring in the compression spring device, said spring being located in series with a helical compression spring.

17 Claims, 2 Drawing Sheets

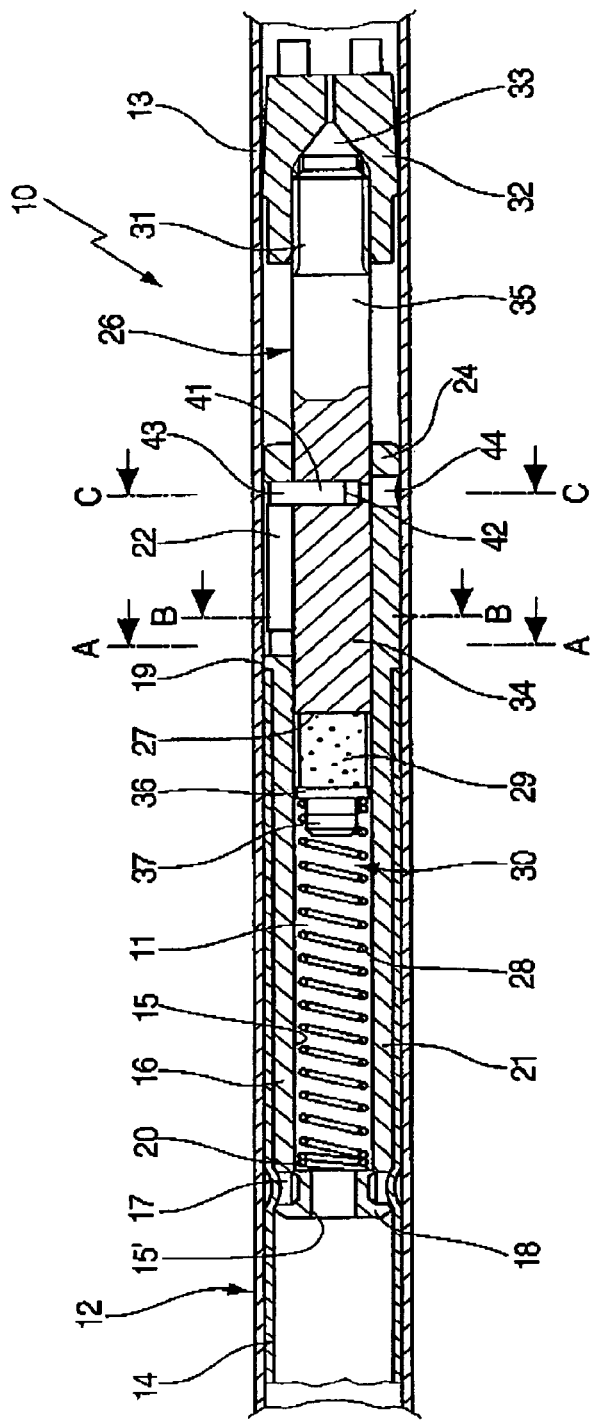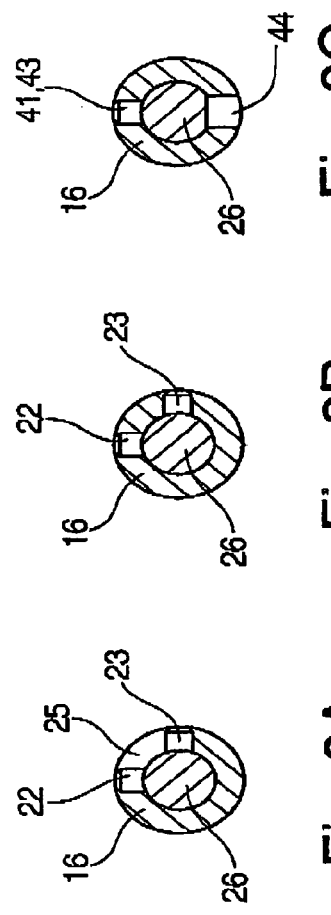
Fig. 1
Fig. 2A  Fig. 2B  Fig. 2C

TREKKING STICK WITH SHOCK ABSORBER

This application is the national stage of PCT/EP02/11198 filed on Oct. 5, 2002 and also claims Paris Convention priority of DE 201 17 146.5 filed on Oct. 18, 2001.

BACKGROUND OF THE INVENTION

The present invention relates to a stick, such as a trekking stick, a ski pole, or a walking stick, in accordance with the preamble of the independent claim.

In a stick of this type such as is known from DE-U 298 13 601, the damper rod is surrounded by a metal coil compression spring, whose pre-stressing level and characteristics, once set, determine the shock-absorbing properties of the stick during use. Disadvantageous in this regard are a relatively hard spring-compression effect and a resilience that the user experiences as jerky and recoil-like. To meet these difficulties, it is possible to employ a specially wound coil spring, which is expensive to manufacture. When metal tubes are used, noise can be generated between the tube and the metal coil compression spring.

It is the objective of the present invention to create a stick, such as a trekking stick, a ski pole, or a walking stick, of the type cited above, whose shock-absorbing properties are less hard and whose resilience properties are less jerky and recoil-like.

SUMMARY OF THE INVENTION

In a stick of the aforementioned type, the features indicated in the independent claim are provided to achieve this objective.

The measures proposed in accordance with the present invention result in a non-linear spring characteristic as well as a softer and quieter compression effect, as the spring force increases. For the user this also means that the perceptible resilience of the stick is significantly more agreeable because it is less jerky and therefore has less recoil.

Especially advantageous is a combination of elastomer spring(s) and coil compression spring(s) in a parallel arrangement or in a tandem arrangement.

In a further advantageous embodiment, one or more elastomer Spring(s) is/are arranged on one or both axial ends of one or more coil compression spring(s), further optimizing the shock-absorbing properties. Elastomer springs having varying degrees of hardness may be provided.

In one exemplary embodiment, the one axial end of the tandem arrangement composed of the coil compression spring and the elastomer spring or Springs contacts an interior shoulder of the guide sleeve, and the other end contacts the axial end face of the damper rod. The metal coil spring in this tandem arrangement may thereby be guided within the guide sleeve, which is preferably made of plastic.

The elastomer spring can have varying cross-sections. In one preferred variant, the elastomer spring is a hollow cylinder which can surround one or more metal coil spring (s). In an additional alternative exemplary embodiment, the elastomer spring is a solid cylinder and may have an exterior circumference that expands, for example, in a bulging fashion. This causes an increase in the spring properties and therefore in the shock-absorbing properties, friction from contact with the wall being exploited in the latter case when the elastomer spring widens in response to compression.

An end-side holding device for the coil compression spring results when a disk is provided having a neck that penetrates into the coil comoression spring and which is disposed between an elastomer spring and a coil compression spring.

The damper rod can be fixed in and with respect to the guide sleeve in various axial positions to vary the shock-absorbing properties, i.e., the hardness of the shock absorber, and therefore to be able to better accommodate the individual needs of the user. In this context, an advantageous design configuration is given when the damper rod, in an area arranged in the guide sleeve, is provided with a locking element in the form of a pin that radially extends on one side beyond the damper rod. When the guide sleeve is rotated relative to the damper rod, the pin is selectively received in axial guide grooves that are of differing lengths and that are arranged so as to be distributed over the circumference of the guide sleeve. Two or more guide grooves of differing lengths may be provided having an angular separation of 90° over the circumference of the guide sleeve.

In a further advantageous embodiment, in which the damper rod is fixed in and with respect to the guide sleeve in various axial positions, the shock absorber simultaneously supports the connecting piece that joins two telescopically movable tubular parts, connecting them axially and in a rotation ally fixed manner.

In one particularly advantageous and preferred design, the elastomeric spring is made of a cellular plastic material, preferably a polyurethane foam.

Further details of the present invention can be derived from the following description in which the present invention is described in greater detail and is explained on the basis of the exemplary embodiment shown in the drawing. In the latter:

BRIEF DESCRIPTION OF THE DRAWING

FIG. 1 in a longitudinal, sectional, and truncated representation depicts the area of a stick that is provided with a shock absorber in accordance with a preferred exemplary embodiment of the present invention and FIGS. 2A, 2B, and 2C depict a cross-section along the lines A—A, B—B, and C—C, respectively, of FIG. 1, but without the exterior tube.

DESCRIPTION OF THE PREFERRED EMBODIMENT

Figure 3:
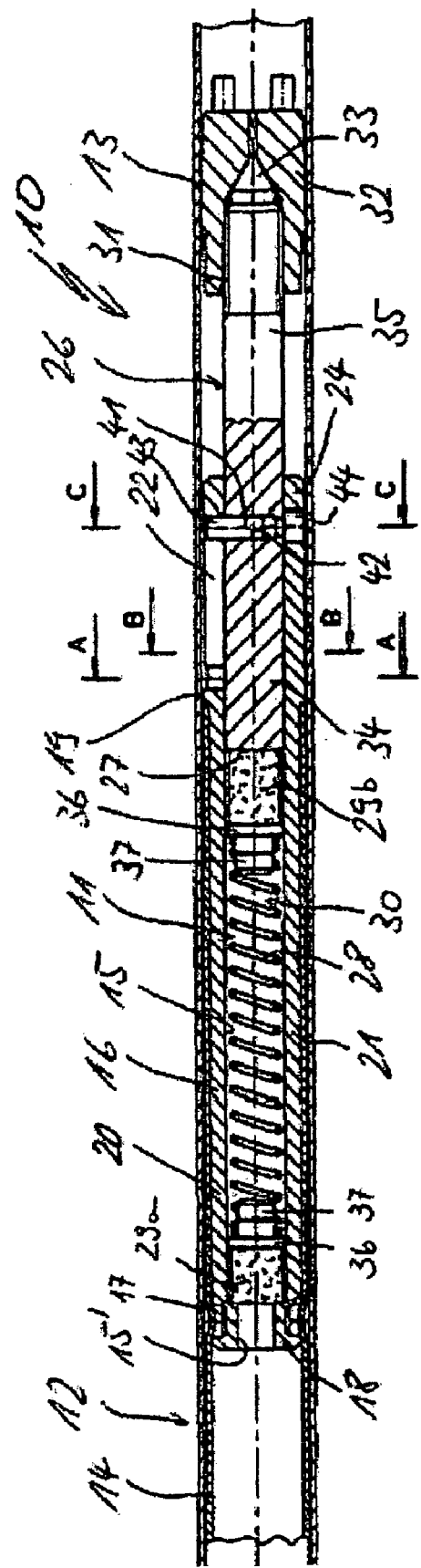
FIG. 3 in a longitudinal, sectional, and truncated representation depicts the area of a stick that is provided with a shock absorber in accordance with another preferred exemplary embodiment of the present invention.

Stick 10, which is only partially shown in the drawing, for example, in the form of a trekking stick, a ski pole, a walking stick, or the like, is provided with a shock absorber 11, which at one end is supported in a first tubular part 13 of a tubular stick 12 and at the other end is supported in a tubular part 14 of tubular stick 12 that is axially movable within first tubular part 13, so that during use the shock absorber is axially fixed and can be clamped in a rotation ally fixed manner. In this context, tubular stick 12 at one end, i.e., one of tubular parts 13, 14, is joined to (or provided with) an undepicted handle, and tubular stick 12 at the other end, i.e., the other tubular part 14, 13, is joined to (or provided with) an undepicted tip or other telescopic tubular part.

Shock absorber 11 has a guide sleeve 16 that is made of plastic for example, which at one interior area 21 is inserted into other tubular part 14, which is thinner here, and which is axially supported at its inner free end 18 within tubular part 14 so as to be fixed to the periphery. As can be seen in FIG. 1, end 18 is provided with radial blind bore holes 17, into which tubular part 14 is pressed around the circumference, so that the aforementioned axial and circumferential attachment is non-detachably provided. Guide sleeve 16 in an exterior area is provided with a collar 19, which contacts the annular end face of second tubular part 14. It is obvious that guide sleeve 16 can also be pressed into and/or glued to tubular part 14. Guide sleeve 16 has an axial bore hole 15, which terminates in an interior annular shoulder 20 of free end 18 and, within end 18, becomes a bore hole 15' having a smaller diameter.

In area 24 that extends beyond tubular part 14 and that has a greater diameter than inner area 21, guide sleeve 16 has two axial grooves 22, 23, that are set at a 90° angle to each other and that are created from the exterior circumference of guide sleeve 16. On their end facing interior area 21, grooves 22 and 23 are joined to each other by a radially oriented, circumferential groove 25 encompassing 90°. Axial grooves 22, 23 and circumferential groove 25 have identical widths.

From the point of view of circumferential groove 25, axial groove 22 has a greater axial length than axial groove 23. The length of longer groove 22 can be derived from FIG. 1, whereas the length of shorter axial groove 23 is only implicit in FIG. 1.

In addition, shock absorber 11 has a damper rod 26, which has a cylindrical cross section and which at one interior end area 34 is guided in guide sleeve 16 so as to be axially displaceable. At other, exterior end area 35, damper rod 26 is provided with an exterior thread 31 and a conical tip 33, onto or over which can be screwed a spreading element 32, which supports shock absorber 11 in larger-diameter, first tubular part 13 so as to be rotation ally and axially fixed but still detachable.

Supported between end face 27 of damper rod 26 and interior shoulder 20 in guide sleeve 16 is a compression spring arrangement 30, which is composed of a tandem arrangement of a coil compression spring 28 made of steel spring wire and an elastomeric spring 29 made of plastic. Elastomeric spring 29 is preferably made of a cellular plastic material, preferably a polyurethane foam. If an elastomeric spring 29 is arranged on one end of coil compression spring 28 that faces damper rod 26, as in the exemplary embodiment depicted in FIG. 1, it is obvious that an elastomeric spring 29 of this type can be provided on one and/or the other end of coil compression spring 28, as illustrated in FIG. 3 where each spring is identified as 29a and 29b. It is also conceivable to arrange more than one elastomeric spring 29, in tandem, on one or both ends of coil compression spring 28, in which case it would also be sensible to furnish said elastomeric springs 29, arranged in tandem, with different spring characteristics, e.g., based on different degrees of hardness. In the exemplary embodiment, elastomeric spring 29 is configured so as to be a solid cylinder and engages end face 27 of damper rod 26 so as to have an identical or smaller exterior diameter. It is also conceivable to provide elastomeric spring 29 with an exterior diameter that bulges out when it is compressed, so that the elastomeric spring generates friction on the interior wall of axial borehole 15, which can be exploited to alter the shock-absorbing properties. The far end of elastomeric spring 29 is covered by a disk 36, whose shaped neck 37 extends into one end of coil compression spring 28.

In the initial position shown in FIG. 1, compression spring arrangement 30 is pre-stressed, so that damper rod 26 is pressed at a contact pin 41 against a limit stop on guide sleeve 16, which damper rod 26 is held stationary within tubular part 13 by spreading element 32. Contact pin 41 lies in a roughly longitudinal central area in a transverse bore hole 42 through damper rod 26. Contact pin 41 on one side extends radially beyond the exterior circumference of damper rod 26 and engages t this end 43 in one of the two axial grooves, in the case of FIG. 1, in groove 22. The end of contact pin 41 that is diametrically opposite is situated within transverse bore hole 42 that is configured as a stepped bore hole, opposite which in guide sleeve 16 is a radial bore hole 44 that is provided on this exterior circumference area. This radial bore hole 44, having a larger diameter than transverse bore hole 42, plays a role when contact pin 41 is disassembled.

In the arrangement shown in FIG. 1, contact pin 41 with its protruding end 43 in longer groove 22 can be moved axially back and forth, so that compression spring arrangement 30 can be pressed together, or compressed, over a maximum path. A non-linear damping is achieved due to the differing spring characteristics of coil compression spring 28 and elastomeric spring 29. The same applies to the expansion, i.e., the resilience action.

In the fully compressed state of compression spring arrangement 30, end 43 of contact pin 41 is located on the end limit stop as shown in section A—A of FIG. 2A, in which position contact pin end 43 can be moved 90° within circumferential groove, 25. In this position, end 43 of contact pin 41 is then located at the end of shorter axial groove 23, so that when the spring is relaxed, shorter axial groove 23 acts to guide the end of contact pin 43. In this position, which does not stress tubular parts 13, 14 axially, compression spring arrangement 30 is compressed with greater force than is the case in the initial position as in FIG. 1. In other words, in response to repeated axial stressing, a different damping characteristic is generated over a shorter path, the initial damping of the damping characteristic being based on a greater expenditure of force.

Contact pin 41 thus aids in limiting the damping path in the axial relative motion of tubular part 13 and tubular part 14 as well as in the rotation ally fixed connection, or arrangement, of damper rod 26 with respect to guide sleeve 16. It is obvious that to achieve a different pre-stressing of compression spring arrangement 30 it is also possible to provide more than two axial grooves 22, 23 of differing lengths, into which end 43 of contact pin 41 can be placed via a relative rotation of guide sleeve 16 and damper rod 26 in the completely compressed state of compression spring arrangement 30.

Coil compression spring arrangement 30 can only be made up of one or more elastomeric springs. Furthermore, it is also possible to have a combination of elastomeric spring (s) and coil compression spring(s) in a parallel arrangement instead of in a tandem arrangement.

It goes without saying that the shock absorber arrangement can be used also with sticks that are not length-adjustable as well as in sticks that are length-adjustable but have a different adjustment system, such as a pressure knob system that can be adjusted stepwise.

What is claimed is:

1. A stick, a trekking stick, a ski pole or a walking stick comprising:
    a first tubular part;
    a second tubular part;
    a handle cooperating with one of said first and said second tubular parts;
    a tip cooperating with an other one of said first and said second tubular parts;

a guide sleeve supported in a rotationally fixed manner in said first tubular part;

a damper rod axially fixed to said second tubular part, said damper rod axially guided within said guide sleeve; and a compression spring device compressed through axial cooperation with said guide sleeve and said damper rod to form a shock absorber, said compression spring device consisting essentially of a compression spring member having a first and a second axial end, a first elastomeric spring cooperating with said first axial end of said compression spring member, and a second elastomeric spring cooperating with said second axial end of said compression spring member, wherein said first elastomeric spring, said compression spring member, and said second elastomeric spring are connected in series.

2. The stick of claim 1, wherein said first and second elastomeric springs have differing degrees of hardness.

3. The stick of claim 1, wherein said elastomeric spring is a hollow cylinder.

4. The stick of claim 1, wherein said elastomeric spring is a solid cylinder.

5. The stick of claim 4, wherein said elastomeric spring has an exterior circumference that expands.

6. The stick of claim 5, wherein said elastomeric spring has an exterior circumference that expands in a bulging fashion.

7. The stick of claim 1, wherein said compression spring device further comprises a disk disposed between said first elastomeric spring and said compression spring member, said disk having a neck that penetrates into said compression spring member.

8. The stick of claim 1, wherein said damper rod can be fixed in and with respect to said guide sleeve in a plurality of axial positions.

9. The stick of claim 8, wherein said damper rod comprises a locking pin that radially extends on one side beyond said damper rod, wherein said guide sleeve has axial guide grooves of differing lengths, said axial guide grooves being distributed over a circumference of said guide sleeve, wherein said guide pin is selectively received in one of said axial guide grooves when said guide sleeve is rotated relative to said damper rod.

10. The stick of claim 9, wherein two or more guide grooves of varying lengths are provided having an angular separation of 90° about said circumference of said guide sleeve.

11. The stick of claim 1, wherein said damper rod comprises a connecting piece disposed at an end thereof facing away from said guide sleeve to axially fix said damper rod to said second tubular part in a continuous, friction-locking manner.

12. The stick of claim 1, wherein said elastomeric spring is made from a cellular plastic material.

13. The stick of claim 12, wherein said cellular plastic material comprises polyurethane foam.

14. The stick of claim 1, wherein an axial end of one of said first and second elastomeric springs is covered by a disk having a shaped neck that extends into one axial end of said compression spring.

15. The stick of claim 14, wherein an axial end of each of said first and second elastomeric springs is covered by a disk having a shaped neck that extends into an adjacent axial end of said compression spring.

16. The stick of claim 1, wherein said damper rod can be fixed in and with respect to said guide sleeve in a plurality of axial positions, such that the compression spring device is pre-stressed.

17. The stick of claim 1, wherein at least one of said elastomeric springs is sized to generate friction on the interior wall of an axial borehole.

* * * * *